US007489341B2

United States Patent
Yang et al.

(10) Patent No.: US 7,489,341 B2
(45) Date of Patent: Feb. 10, 2009

(54) METHOD TO STABILIZE DIGITAL VIDEO MOTION

(75) Inventors: Shih-Hsuan Yang, Taipei (TW); Fu-Ming Jheng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 706 days.

(21) Appl. No.: 10/905,699

(22) Filed: Jan. 18, 2005

(65) Prior Publication Data

US 2006/0158524 A1    Jul. 20, 2006

(51) Int. Cl.
*H04N 5/228* (2006.01)

(52) U.S. Cl. .............................. 348/208.99; 348/208.4; 348/208.6

(58) Field of Classification Search .............. 348/208.3, 348/208.6

See application file for complete search history.

(56) References Cited

U.S. PATENT DOCUMENTS 5,629,988 A * 5/1997 Burt et al. ................... 382/276
6,130,709 A * 10/2000 Sekine et al. ............ 348/208.8
6,809,758 B1 * 10/2004 Jones ..................... 348/208.99
2005/0179784 A1 * 8/2005 Qi .......................... 348/208.1
2006/0066728 A1 * 3/2006 Batur .................... 348/208.99

* cited by examiner

*Primary Examiner*—Sinh N Tran
*Assistant Examiner*—Paul Berardesca
(74) *Attorney, Agent, or Firm*—Winston Hsu

(57) ABSTRACT

A digital video image stabilization method features scene change detection, adaptive stabilization in two dimensions, prevention of accumulated-compensation saturation, multi-resolution motion estimation, and compatibility with MPEG video encoding standards. The method uses block-based motion estimation on a selected set of macroblocks, which generates and validates a set of motion vectors, to determine how a digital camcorder or other video recording device is moving; accumulates motion data to estimate and preserve overall motion due to panning while eliminating small variations due to shaking; and resets its accumulated motion data when it detects a scene change. The method uses this information to select a sub-image from a larger image for the selected video frame. When one or more edges of the sub-image approach the edges of the larger image, the method reduces its correction factor to transition smoothly to a faster pan and prevent saturation.

14 Claims, 4 Drawing Sheets

METHOD TO STABILIZE DIGITAL VIDEO MOTION

BACKGROUND OF INVENTION

1. Field of the Invention

The present invention relates to digital video recording, and more particularly, to a method of stabilizing digital video recording in two dimensions when recording a scene with an unstabilized digital video camera.

2. Description of the Prior Art

Home video camcorders have become increasingly popular in recent years, with people recording everything from their children's antics to space shuttle launches. One reason for their increasing popularity is that camcorders are becoming smaller. While anyone who has hauled a heavy video camera around appreciates the lower weight, it has come at a cost: the mass of the camera no longer helps to keep the camera, and hence the image, steady. A shaky video makes for poor viewing, since the jittery image is distracting to viewers.

Lately, with the conversion to digital video camcorders, digital image stabilization has become a popular feature. However, the current methods have a number of disadvantages. They only stabilize in one axis, have significant computational overhead requiring bulky circuitry and high power requirements, and the compensation algorithm can become overwhelmed, or "saturated", meaning that it can fail to compensate properly especially when the camera is being panned across a scene, resulting in an unstabilized image.

A key limitation is that by only stabilizing in a single axis, most current methods of stabilizing digital video do not address a key part of the problem: one of the most distracting parts of an unstabilized video image is unintended motion away from the general motion of the scene. In other words, unintended motion occurring orthogonal to the vector of the intended pan is more distracting than motion occurring inline with the vector.

A typical prior-art stabilization method uses block based motion estimation which divides the captured video frame into a plurality of squares, called macroblocks, compares these macroblocks against a set of prior video frames, determines how much the image has shifted, and selects a subregion of the captured video frame to record as the current frame of the video. The comparison chooses macroblocks that are 16 pixels wide and 16 pixels high, and searches up to 64 pixels in all directions using half-pixel resolution. However, this method is extremely computationally intensive and is unsuitable for implementation in a real-time consumer device due to the complexity, size, and expense of the computer hardware required.

A second prior-art stabilization method uses block based motion estimation which involves choosing a subset of 28 macroblocks, sized 64×64 pixels, and searching within 30 pixels in all directions using full-pixel resolution. Again, however, this method is extremely computationally intensive and is unsuitable for implementation in a real-time consumer device due to the complexity, size, and expense of the computer hardware required; additionally, this method is not directly compatible with the MPEG video standards used in digital video recorders due to the large size of the macroblocks.

Another method, described by Jones in U.S. Pat. No. 6,809,758 attempts to use histograms to stabilize film being converted to digital video, but the method is limited, requiring manual scene-change detection and using an algorithm which is suited to the more specific case of correcting frame jumping during the film conversion process. Jones' algorithm detects rapid jumps in estimated motion and smoothes these out, while not affecting smaller transitions that fall within a threshold. However, small transitions, such as vertical oscillations due to hand shaking or in an extreme case due to a boat rocking on the waves, are a type of motion which it is particularly desirable to eliminate.

An improved method for stabilizing digital video images in two dimensions is clearly necessary in order to improve the viewing experience, especially regarding eliminating the undesirable orthogonal random motion.

SUMMARY OF INVENTION

It is therefore a primary objective of the present invention to provide a multi-resolution search method and motion vector estimation method, so as to provide an improvement over the prior art.

A further objective of the present invention is to provide a method for stabilizing digital video images which has reduced complexity such that it can be implemented in a cost-effective manner.

A further objective of the present invention is to provide a method for detecting a change of scene in a video stream, so that stabilization will be performed without regard to data accumulated from an earlier scene.

A further objective of the present invention is to provide a method for stabilizing a digital video image in two dimensions.

To attain these objectives, the claimed invention provides a method for stabilizing digital video motion comprising: selecting a current video frame and a previous video frame from a video stream, dividing the current video frame into a plurality of macroblocks, selecting a subset of macroblocks from the current video frame, comparing the subset of macroblocks to the previous video frame within a two-dimensional comparison range to generate a set of motion vectors, calculating a frame motion vector for the current video frame, estimating a steady motion vector for the current video frame by a first-order autoregression, calculating a hand motion vector for the current video frame by taking the difference between the steady motion vector and the frame motion vector of the current video frame, and offsetting the current video frame by the hand motion vector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
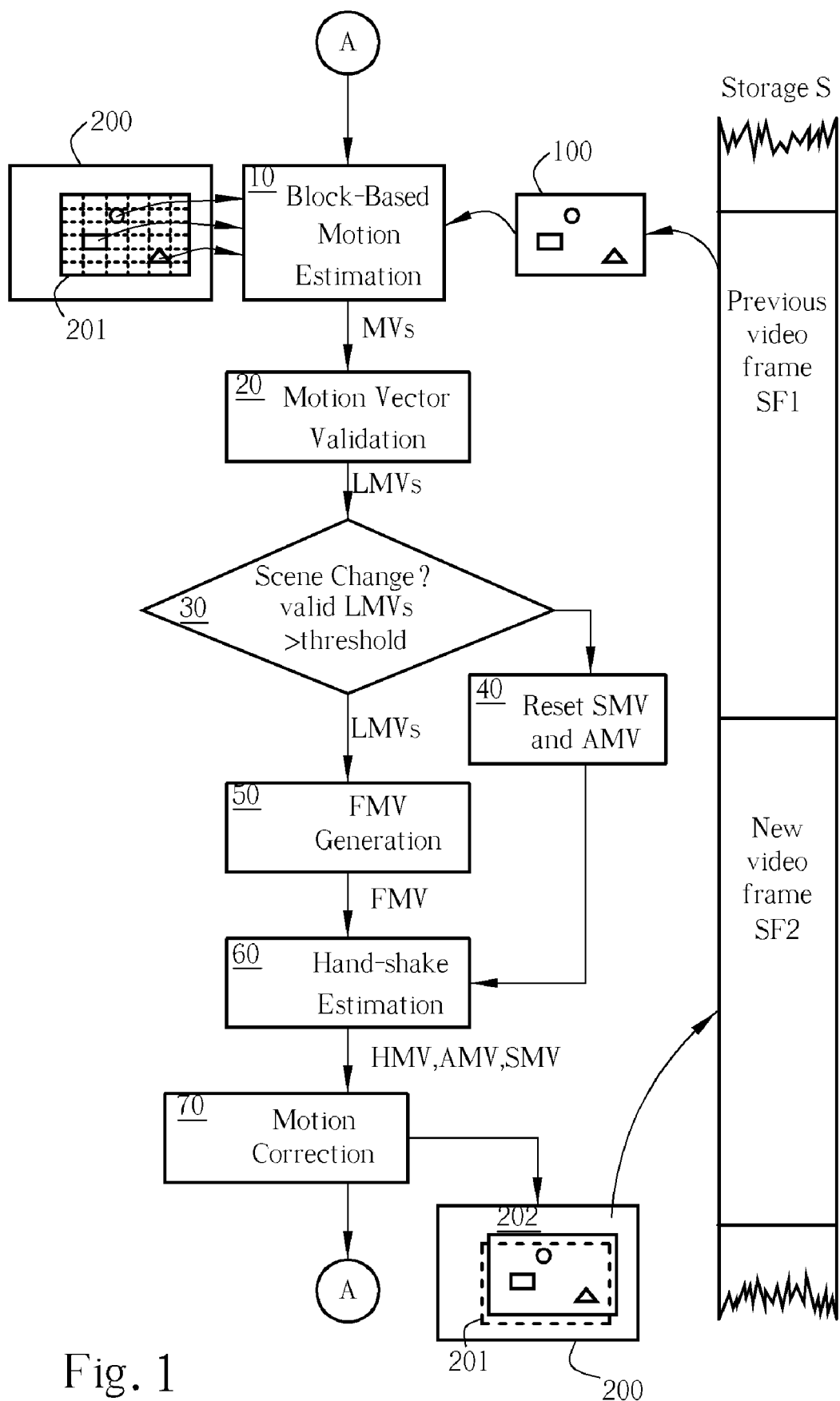
FIG. 1 is a flowchart illustrating the method of the present invention and its data inputs.

Please refer to FIG. 1, which is a flowchart illustrating a preferred embodiment of the method of the present invention and its data inputs. A digital video stream is composed of a sequence of frames. Each frame is processed and a subregion of the frame is recorded to storage S, typically a magnetic tape, a magnetic hard drive, a flash memory medium, or any of a number of types of writable or rewritable optical media such as CD-R, CD-RW, DVD-R, DVD-RW, DVD+R, DVD+RW, DVD-RAM, BluRay, or other writable digital media. The process starts with an initial condition of no prior motion history where a frame number is 1, a frame motion vector (FMV) is <0,0>, an accumulated motion vector (AMV) is initially <0,0> and a smooth motion vector (SMV) is initially <0,0>. An input video frame 200 is generated by a video source V, such as a video camera, a broadcast video signal, a film being converted to digital video, or a previously recorded digital video. In the case of this first frame, no prior frame 100 exists against which to compare data of the input video frame 200, so no motion vectors (MVs) are generated and Block-Based Motion Estimation 10 (further described below) and Motion Vector Validation 20 (further described below) are not performed. The process moves on to Hand-Shake Estimation 60, where the handshake motion vector (HMV) is set to <0,0> by the formula $$HMV(n)=FMV(n)-SMV(n) \quad \text{(eq 1)}$$

where the index n indicates the frame number. (Hand-Shake Estimation 60 in this case is very simple, but will be further discussed below for the general case.) Next, the process applies Motion Correction 70 to the input video frame 200. In this initial case, a selected video frame 202 will be taken from the center of the input video frame 200. The selected video frame 202 is then moved to be processed for storage, where it will be retained for the next cycle as the prior frame 100, and will also be written to storage S as a video frame, for example as the previous video frame SF1. It should be noted that in this initial case, FMV Generation 50 is not encountered.

Figure 2:
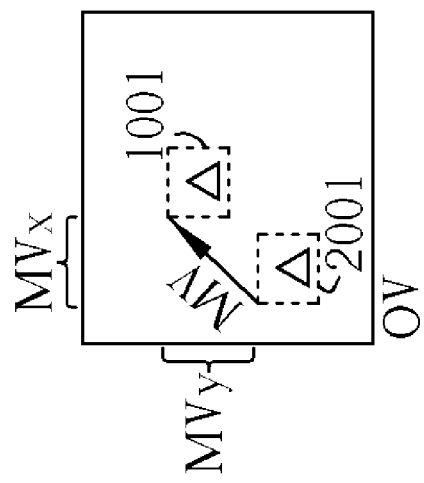
FIG. 2 is a diagram illustrating the computation of motion vectors.
Figure 2:
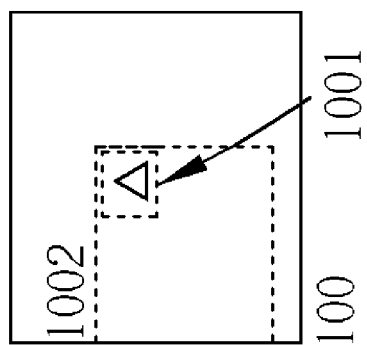
Figure 2:
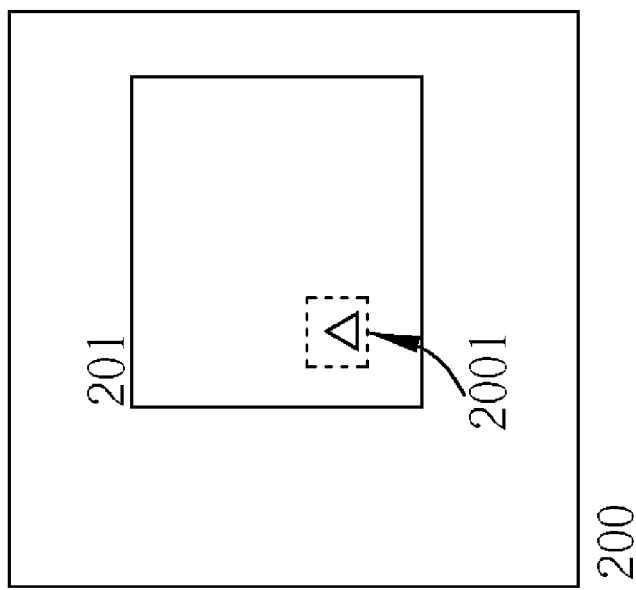

Please refer to FIG. 2 in combination with FIG. 1. During subsequent frames when a scene change is not encountered, the process is slightly different. Block-Based Motion Estimation 10 generates motion vectors by dividing the input video frame 200 into macroblocks (MBs). The input video frame 200 is divided into a grid of MBs, each 16×16 pixels square. A subset of MBs are selected from the frame; in one version of the preferred embodiment, 135 MBs are chosen, sparsely located on a 15-by-9 grid within the frame. To lower processor requirements, a multiresolution reduced-complexity search, using digital signal processing techniques, is performed to find where these MBs were located in the prior frame 100. The search first is performed in a 2-pixel pyramidial grid, in a region 1002 of the prior frame 100 within ±32 pixels in each direction from the coordinates of the center of the MB in the input video frame 200, to find the least-distortion point, after which a standard search is performed to find a closest match 1001 at 1-pixel resolution. 2D MVs are generated from the matches; these motion vectors' horizontal component $MV_x$ and vertical component $MV_y$ are, respectively, the number of pixels in the horizontal and vertical directions that the search determines the MBs have moved between the prior frame 100 and the input video frame 200. (The overlay OV, which illustrates the input video frame 200 superimposed over the prior frame 100, further shows the relative positions of the MB 2001 and its closest match 1001.)

The vectors generated in Block-Based Motion Estimation 10 are then passed to Motion Vector Validation 20. Each macroblock and its associated MV undergo three tests to determine whether they will be discarded. First, the MBs are evaluated for a lack of features, such as being a patch of blue sky or other vague area. This is done through calculating the mean absolute difference (MAD) of the MB. When the average MAD within the MB's search region is less than 60, the MB's associated MV is discarded. Second, to eliminate a potential repeated pattern, the two MBs with the smallest MAD values are compared, and if the smallest MAD is larger than 0.98 of the second-smallest and the smallest-MAD MB's MV is larger than 1.5 pixels of the second-smallest-MAD MB's MV, then the smallest-MAD MB's associated MV is discarded. Third, the smallest MAD value is tested against a threshold value, and if the smallest MAD value is found to be above the threshold (chosen as 10 in the preferred embodiment), the associated MV is discarded.

The remaining vectors which passed the tests in Motion Vector Validation, called LMVs, are passed along to Scene Change 30. Scene Change 30 simply tests to see if the number of LMVs is above a lower threshold. If too few LMVs remain, the method detects a scene change and proceeds to Reset 40, where the frame motion vector (FMV) is set to <0,0>, the smooth motion vector (SMV) is set to <0,0>, the accumulated handshake motion vector (AMV) is set to <0,0>, and the frame counter is reset to 1. When no scene change is detected in Scene Change 30, i.e., the count of LMVs is above the threshold, the process passes the validated LMVs along to FMV Generation 50.

In FMV Generation 50, the median horizontal component and the median vertical component are selected from the union of the LMVs and the previous FMV(n−1). These median values are the frame motion vector of the current frame, FMV(n), and this new FMV(n) is passed along to Hand-Shake Estimation 60.

Hand-Shake Estimation 60 is the core of the process. Pixel movement within an image sequence comes from three factors: object motion (such as a walking person), intentional camera motion (such as panning and zooming), and unintentional camera motion (such as hand shake). The goal of digital image stabilization is to eliminate the unintentional motion while preserving intentional motion and object motion.

Referring back to equation 1, HMV(n)=FMV(n)−SMV(n), handshake is estimated by estimating the smooth motion vector and then subtracting it from the frame motion vector. The present invention uses motion vector integration (MVI) to generate a SMV. The basic MVI is in the form of a first-order autoregression:

$$SMV(n)=\alpha SMV(n-1)+\beta FMV(n); \text{ where } \alpha=1-\beta; \quad \text{(eq. 2)}$$

A major issue for MVI is to select a damping factor, α. A larger value leads to a smoother, but overly-damped and artificially stabilized, image sequence. A smaller value yields less handshake compensation. The preferred embodiment uses an initial value of 0.4 for β, leading to a value of 0.6 for α. This value is adapted as follows. Let $$TMV(n)=FMV(n)-SMV(n-1), \text{ where} \quad \text{(eq. 3a)}$$

$$SMV(1)=FMV(1) \quad \text{(eq. 3b)}$$

It should be noted that the SMV is the predicted motion, while the FMV is the actual motion. TMV(n) is an estimate of the handshake motion HMV(n) of the current frame. A correlation between TMV(n) and SMV(n−1) is computed:

$$\rho = \left| \frac{\langle TMV(n), SMV(n-1) \rangle}{\sqrt{\langle TMV(n), TMV(n) \rangle} \sqrt{\langle SMV(n-1), SMV(n-1) \rangle}} \right| \quad \text{(eq. 4)}$$

where the notation <a,b> is the inner product between two vectors a and b. The value of ρ is in the range 0-1 inclusive. The smaller ρ (closer to 0), the more inconsistent the directions of TMV(n) (hand motion) and SMV(n−1) (intentional motion). As the TMV approaches right angles (90 degrees) to the predicted SMV, ρ approaches zero; as the TMV becomes close to the SMV (0 degrees or 180 degrees), ρ approaches one. To combine 1D and 2D MVI, we use $$\beta = \min(\rho, 0.4); \quad \alpha = 1 - \beta \quad (eq\ 5)$$

in combination with the MVI formula of equation 2. In a typical video sequence, about 20% to 25% of ρ values are below 0.4, and thus are used as the value of β for that frame. By using a smaller value for β when the vectors diverge further, the method stabilizes unintentional motion while allowing intentional motion. Consequently, an accurate SMV(n) can be determined by equation 2, and an accurate HMV(n) can be determined by equation 1.

Finally, the HMV(n) and SMV(n) are passed along to Motion Correction 70, wherein an accumulated motion vector AMV(n) is computed by summing the HMVs since the last scene change:

$$AMV(n) = \sum_{i=2}^{n} HMV(i) \quad (eq\ 6a)$$

This can be implemented straightforwardly in an equivalent manner by the following:

$$AMV(2) = HMV(2), \text{ when } n=2 \quad (eq\ 6b)$$

$$AMV(n) = AMV(n-1) + HMV(n), \text{ when } n>2 \quad (eq\ 6c)$$

where n is the current frame, and the AMV is the sum of all HMVs from the start of the most recent scene change. Note that this starts at a frame counter of 2, since the initial frame of a scene has no vector computed for it due to the nonexistence of any prior frame in the series.

Motion Correction 70 then uses the current AMV(n) as an offset vector within the input video frame 200 to crop a selected video frame 202 of predetermined size from the input video frame 200. The selected video frame 202 is then moved to be processed for storage, where it will be retained for the next cycle as the prior frame 100, and will also be written to storage S as a video frame, for example the new video frame SF2.

The cycle then repeats the loop.

Figure 3:
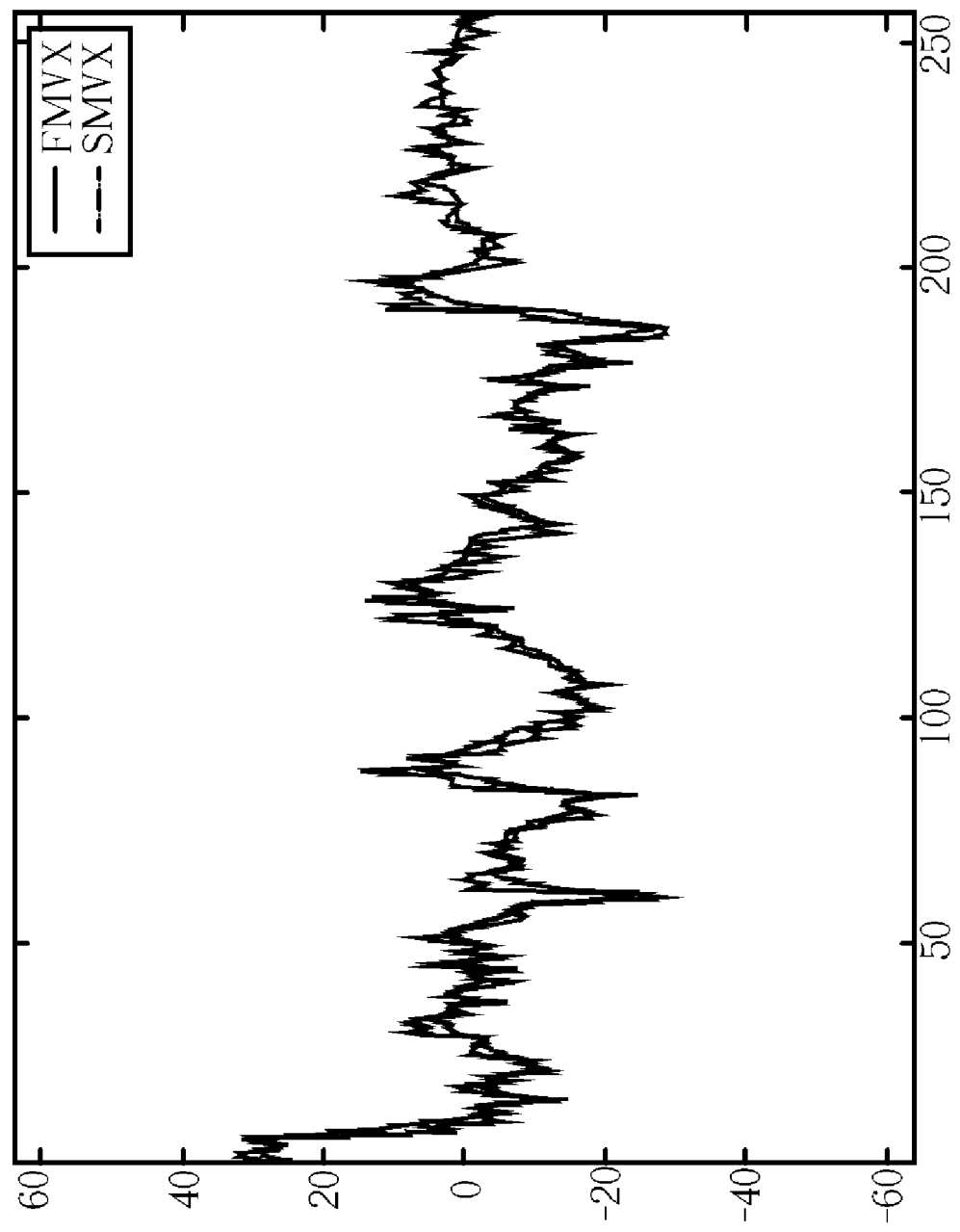
FIG. 3 is a graph showing the horizontal motion detected in a sample video stream and the image stabilization method applied thereon.
Figure 4:
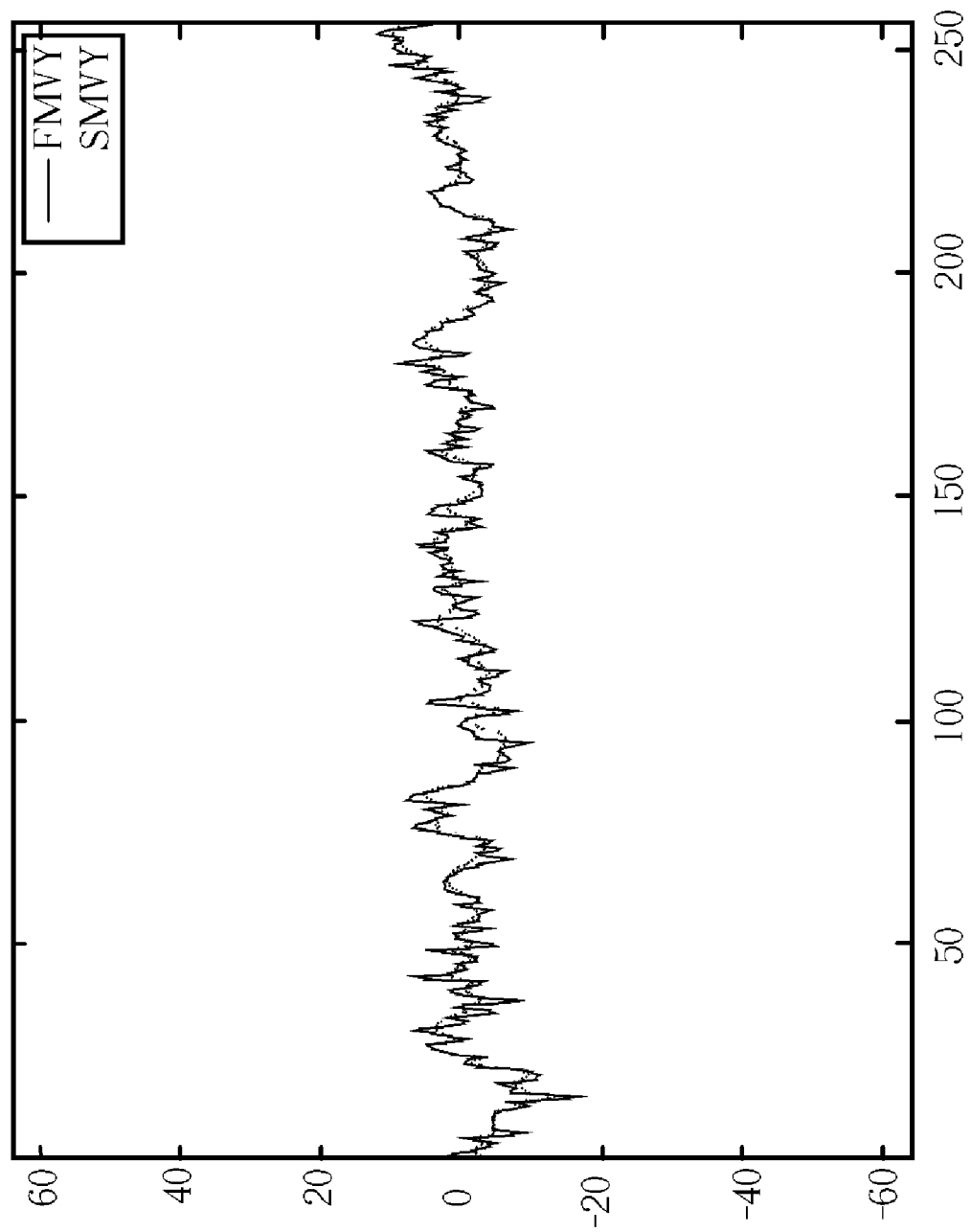
FIG. 4 is a graph showing the vertical motion detected in a sample video stream and the image stabilization method applied thereon.

The preferred embodiment restricts the AMV range to lie between ±60 pixels horizontally and ±40 pixels vertically. To prevent saturation, when the AMV exceeds 75% of the limit in any direction, the next HMV is halved if it will bring the AMV closer to the limit. It should be noted that the MVI method above alleviates large changes in HMV, resulting in the SMV being less rugged. Please refer to FIG. 3 and FIG. 4, which show graphs of the smooth motion vector and frame motion vector in, respectively, the horizontal (X) axis and vertical (Y) axis. The graphs show the smoothing effects of the method of the present invention on the generated SMV curve from the raw motion of the HMV chart.

A further improvement can be made by adaptively changing equation 5 using a variable limit instead of a constant. Another embodiment of the present invention uses an adaptive method for limiting β with the following pseudocode:

if $((FMV(n) - SMV(n-1) > T1)$ (eq 7)

and $(FMV(n-1) - SMV(n-2) > T2)$ and $(FMV(n-2) - SMV(n-3) > T3))$ or $((FMV(n) - SMV(n-1) < -T1)$ and $(FMV(n-1) - SMV(n-2) < -T2)$ and $(FMV(n-2) - SMV(n-3) < -T3))$ then $b = 0.8$;

else $b = 0.1$;

where, for horizontal motion, T1=15, T2=10, and T3=5; and for vertical motion, T1=12, T2=8, and T3=4. This tests whether the FMV is oscillating and whether the SMV lags far behind the FMV. This is thus tested separately for horizontal and vertical components. Accordingly, let there be a $b_x$ and $b_y$ for X and Y directions respectively, and separate $\alpha_x$, $\alpha_y$, $\beta_x$ and $\beta_y$, as well. Then:

$$\beta_x = \min(\rho, b_x); \quad \alpha_x = 1 - \beta_x \quad (eq\ 8a)$$

$$\beta_y = \min(\rho, b_y); \quad \alpha_y = 1 - \beta_y \quad (eq\ 8b)$$

This results in a much smoother curve, adaptively damping the unwanted motion.

The invention can be readily applied to devices using MPEG video encoding or another type of autonomous or predictive encoding, however this need not limit applications of the invention.

Compared to the prior art, the present invention results in a smoother, more stabilized video, which reacts naturally to intentional panning while filtering out unintentional motion due to hand shaking. The search method increases the speed of searching by a factor of three over the prior art, or a factor of ten if multiresolution estimation is used.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for stabilizing digital video motion comprising:

selecting a current video frame and a previous video frame from a video stream;

dividing the current video frame into a plurality of macroblocks;

selecting a subset of macroblocks from the current video frame;

comparing the subset of macroblocks to the previous video frame within a two-dimensional comparison range to generate a set of motion vectors;

calculating a frame motion vector for the current video frame; estimating a steady motion vector for the current video frame by a first-order autoregression, wherein the first-order autoregression comprises:

multiplying the frame motion vector of the current frame by a first constant;

multiplying the steady motion vector of the previous video frame by a second constant, wherein the first constant is a floating-point value in a range of 0-1 inclusive, the second constant is calculated by subtracting the first constant from 1, and the first constant is chosen to be a lesser of a third constant and a correlation value;

computing an estimated hand motion vector of the current video frame by subtracting the steady motion vector of the previous video frame from the frame motion vector of the current video frame; and calculating the correlation value between the estimated hand motion vector and the steady motion vector by taking an absolute value of an inner product of the estimated hand motion vector of the current video frame and steady motion vector of the previous video frame, and dividing the absolute value by a product of a square root of an inner product of the estimated hand motion vector of the current video frame and the estimated hand motion vector of the current video frame and a square root of an inner product of the steady motion vector of the previous video frame and the steady motion vector of the previous video frame;

calculating a hand motion vector for the current video frame by taking a difference between the steady motion vector and the frame motion vector of the current video frame;

cropping a selected video frame from the current video frame, wherein a center of the selected video frame is offset from a center of the current video frame by the hand motion vector; and recording the selected video frame to a storage device.

2. The method of claim 1 further comprising deselecting one or more macroblocks from the subset of macroblocks based upon a mean average difference within a search region within a first number of pixels around the macroblock being below a threshold value, a lack of features within the macroblock, or repeated patterns within the previous video frame.

3. The method of claim 1 wherein calculating the frame motion vector comprises selecting a median vertical component and a median horizontal component from the set of motion vectors and the frame motion vector for the previous video frame.

4. The method of claim 1 where the third constant is substantially 0.40.

5. The method of claim 1 farther comprising:
dividing a horizontal magnitude of the hand motion vector by 2 when the horizontal magnitude of an accumulated motion vector is larger than a quantity generated by multiplying a horizontal range limit by a scaling factor; and
dividing a vertical magnitude of the hand motion vector by 2 when the vertical magnitude of the accumulated motion vector is larger than a quantity generated by multiplying a vertical range limit by a scaling factor.

6. The method of claim 1 wherein a size of the macroblock is chosen to be compatible with a MPEG video encoding standard.

7. The method of claim 1 wherein the previous frame is selected to be the current frame when analyzing a first frame or when a count of the macroblocks in the subset of macroblocks is below a threshold value.

8. A digital video recording device comprising a lens, a means of capturing a sequence of images, a storage device, and a processor that performs the method of claim 1.

9. A method for stabilizing digital video motion comprising:
selecting a current video frame and a previous video frame from a video stream;
dividing the current video frame into a plurality of macroblocks, such that the macroblock size is suitable for either autonomously encoded or predictively encoded pictures;
selecting a subset of macroblocks from the current video frame;
comparing the subset of macroblocks to the previous video frame within a two-dimensional comparison range to generate a set of motion vectors;
calculating a frame motion vector for the current video frame by selecting a median vertical component and a median horizontal component from the set of motion vectors and the frame motion vector for the previous video frame;
estimating a steady motion vector for the current video frame by a first-order autoregression, wherein the first-order autoregression comprises:
multiplying the frame motion vector of the current frame by a first constant;
multiplying the steady motion vector of the previous video frame by a second constant, wherein the first constant is a floating-point value in a range of 0-1 inclusive, the second constant is calculated by subtracting the first constant from 1, and the first constant is chosen to be a lesser of a third constant and a correlation value;
computing an estimated hand motion vector of the current video frame by subtracting the steady motion vector of the previous video frame from the frame motion vector of the current video frame; and
calculating the correlation value between the estimated hand motion vector and the steady motion vector by taking an absolute value of an inner product of the estimated hand motion vector of the current video frame and steady motion vector of the previous video frame, and dividing the absolute value by a product of a square root of an inner product of the estimated hand motion vector of the current video frame and the estimated hand motion vector of the current video frame and a square root of an inner product of the steady motion vector of the previous video frame and the steady motion vector of the previous video frame;
calculating a hand motion vector for the current video frame by taking a difference between the steady motion vector and the frame motion vector of the current video frame;
cropping a selected video frame from the current video frame, wherein a center of the selected video frame is offset from a center of the current video frame by the hand motion vector; and
recording the selected video frame to a storage device.

10. The method of claim 9 further comprising deselecting one or more macroblocks from the subset of macroblocks based upon a mean average difference within a search region within a first number of pixels around the macroblock being below a threshold value, a lack of features within the macroblock, or repeated patterns within the previous video frame.

11. The method of claim 9 where the third constant is substantially 0.40.

12. The method of claim 9 further comprising:
dividing a horizontal magnitude of the hand motion vector by 2 when the horizontal magnitude of an average motion vector is larger than a quantity generated by multiplying a horizontal range limit by a scaling factor; and
dividing a vertical magnitude of the hand motion vector by 2 when the vertical magnitude of the average motion vector is larger than a quantity generated by multiplying a vertical range limit by a scaling factor.

13. The method of claim 9 wherein the previous frame is selected to be the current frame when analyzing a first frame or when a count of the macroblocks in the subset of macroblocks is below a threshold value.

14. A digital video recording device comprising a lens, a means of capturing a sequence of images, a storage device, and a processor that performs the method of claim 9.

* * * * *